United States Patent Office 2,697,706
Patented Dec. 21, 1954

2,697,706

ADDUCTS OF 3β-ACYLOXY-5,7,9(11)-PREGNATRIEN-12,20-DIONES

Robert H. Levin and George B. Spero, Kalamazoo Township, Kalamazoo County, and A Vern McIntosh, Jr., Kalamazoo, Mich., assignors to The Upjohn Company, Kalamazoo, Mich., a corporation of Michigan No Drawing. Application May 22, 1953, Serial No. 356,894

6 Claims. (Cl. 260—239.55)

The present invention relates to adducts of 3β-acyloxy-5,7,9(11)-pregnatrien-12,20-diones with certain acids, anhydrides, imides and esters of α,β-unsaturated dicarboxylic acids, particularly with maleic anhydride, maleimide, maleic acid and esters of maleic acids, and to processes for their production.

This application is a continuation-in-part of our copending application Serial No. 184,702, filed September 13, 1950, now U. S. Patent 2,623,043, issued December 23, 1952 and of our copending application Serial No. 228,133 filed May 24, 1951, now abandoned, to which reference is made also for the preparation of the starting compounds referred to in this specification.

The adducts of 3β-acyloxy-5,7,9(11)-pregnatrien-12,20-diones which are the preferred embodiment of this invention are represented by the following formula:

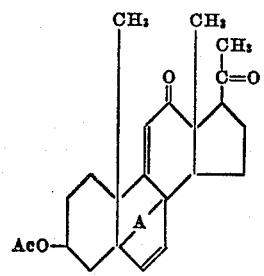

in which Ac is an acyl radical of the residue of an organic carboxylic acid, especially those hydrocarbon aliphatic carboxylic acids containing from 1 to 8 carbon atoms, inclusive, per molecule, and A is the adduct radical of an α,β-unsaturated carbonyl compound of the group consisting of maleic acid, maleic anhydride, maleimide, and dialkyl maleates containing from 1 to 8 carbon atoms, inclusive, in each alkyl radical.

The principal object of the present invention is to provide novel compounds which are useful in the preparation of steroid compounds containing an oxygen atom at carbon atom 11 in the steroid nucleus. Another object of the present invention is to provide a process for the production of these new compounds. Other objects and advantages of the invention, some of which are referred to hereinafter, will be apparent to those skilled in the art to which the invention pertains.

The compounds of the present invention are useful in the preparation of physiologically active steroid compounds which possess an oxygen atom in position 11 or 12. For example, heating a 3β-acyloxy-5,7,9(11)-pregnatriene-12,20-diones with an amine as described by Levin et al. in U. S. Patent 2,577,776, issued December 11, 1951, removes the adduct group yielding a 3β-acyloxy-5,7,9(11)-pregnatriene-12,20-dione, which may be hydrogenated to give 3β-acyloxypregnane-12,20-dione. Hydrolysis of 3β-acyloxypregnane-12,20-dione with sodium hydroxide and oxidation with chromic acid results in the known pregnane-3,12,20-trione [Selye, Encyclopedia of Endocrinology, section I, volume IV, 1943, A. W. T. Franks Publishing Company, Montreal, p. 603; Hoehn and Mason, J. Am. Chem. Soc. 60, 1702 (1938); Reichstein et al., Helv. Chim. Acta 23, 747 (1940)] which, has anesthetic and luteoid properties (Selye reference). When pregnane-3,12,20-trione is reacted with sodium borohydride, the 3-keto and 12-keto groups are reduced. Treatment of the thus-obtained 3α,12-dihydroxy-pregnane-20-one with acetic anhydride yields the 3α-acetate and oxidation of this compound with chromic acid produces 3α-acetoxy-pregnane-12,20-dione which was converted by Gallagher (U. S. Patent 2,447,325, columns 1 and 2) into 3α-hydroxypregnane-11,20-dione, which can be converted to cortisone by the method of Kritchevsky, Garmaise and Gallagher, J. Am. Chem. Soc. 74, 483 (1952).

Compounds of the present invention which are of particular interest are those compounds conforming to the foregoing general formula and in which AcO represents the radical resulting from the esterification of the hydroxyl group of the steroid with a carboxylic acid containing up to and including 8 carbon atoms. Such acids include formic, acetic, propionic, butyric, valeric, hexanoic, heptanoic, octanoic, succinic, glutaric, cyclopentanoic, cyclohexanoic, benzoic, toluic, and the like; the lower aliphatic acids of this group are preferred embodiments of the invention. The acids may contain substituents such as halogen, alkyl and methoxy radicals which are nonreactive with the reagents used in the methods described herein for the preparation of the compounds of the invention. The adduct bridge (—A—) that is represented between the 5 and 8 positions of the steroid nucleus of these compounds may be represented by the graphic formulae:

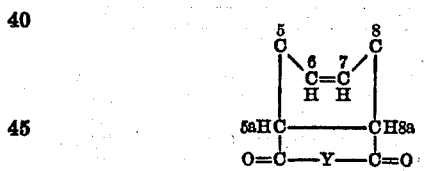

and

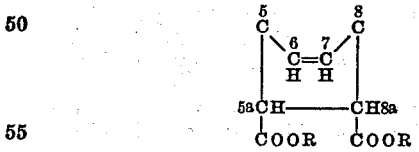

the first of which represents that derived from maleic anhydride and maleimide (in which Y is an oxygen (—O—) or an imino (—NH—) radical) while the second represents that derived from maleic acid and its esters. In this second formula R represents hydrogen or an alkyl radical. Such alkyl radicals (R) include the methyl, ethyl, propyl, isopropyl, butyl, isobutyl, lauryl, heptyl, octyl, cyclopentyl, cyclohexyl, benzyl and similar radicals, which may contain substituents such as halogen, methoxy and hydroxyl radicals, which are nonreactive with the reagents used in the methods described herein for their preparation. While adducts of esters of maleic acids are described herein with particular reference to those of dimethyl maleate, the preferred embodiment of R in the foregoing formula is a lower-alkyl radical containing from 1 to 8 carbon atoms, inclusive.

The compounds of the present invention are usually colorless crystalline solids. Those which are adducts formed from α,β-unsaturated acids and anhydrides are readily convertible to diester adducts by esterification with reagents such as diazoalkanes in accordance with the method described by Wilds et al. in J. Org. Chem. 13, 763 (1948). The adducts of dicarboxylic acids may be converted to adducts of the corresponding dicarboxylic acid anhydrides by heat. The adducts of acid anhydrides may be converted to those of the corresponding acid by hydration with water.

The starting compounds from which the compounds of the present invention are prepared are adducts of 12-hydroxy or 12-bromo-3β-acyloxy-5,7,9(11)-pregnatrien-20-ones with maleic anhydride and its equivalents, having the general formula:

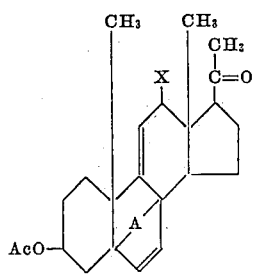

in which A and Ac have the significance hereinbefore specified and X is a bromine or hydroxyl radical. The preparation of these compounds, which is described in detail in our copending applications Serial No. 184,702, filed September 13, 1950, now U. S. Patent 2,623,043, issued December 23, 1952, and Serial No. 228,132, filed May 24, 1951, now abandoned, consists essentially of the following (Alternative procedures are also described in our said copending application):

(1) Dehydroergosterol is converted to an adduct with maleic anhydride or the desired equivalent of maleic anhydride [H. Honigmann, Annalen 508, 89–98 (1934)].

(2) The adduct of dehydroergosterol is esterified by reaction, for example, with benzoyl chloride, acetyl chloride or formic acid.

(3) The resulting adduct of the 3β-acyloxydehydroergosterol is ozonized and then reduced reduced in acid solution with zinc dust to obtain an adduct of a 3β-acyloxybisnor-5,7,9(11)-cholatrien-22-al. (See application of Robert H. Levin, Serial No. 111,100, filed August 18, 1949, now U. S. Patent 2,620,337, issued December 2, 1952, for details.)

(4) An enol ester of the resulting 3β-acyloxybisnor-5,7,9(11)-cholatrien-22-al adduct is prepared and ozonized to the adduct of a 3β-acyloxy-5,7,9(11)-pregnatrien-20-one.

(5) The resulting adduct of the 3β-acyloxy-5,7,9(11)-pregnatrien-20-one is reacted with N-bromosuccinimide or bromine to produce an adduct of a 3β-acyloxy-12-bromo-5,7,9(11)-pregnatrien-20-one.

(6) The adduct of the 3β-acyloxy-12-bromo-5,7,9(11)-pregnatrien-20-one, on reaction with silver nitrate as described in our copending application Serial No. 228,131, filed May 24, 1951, now abandoned, yields the adduct of a 3β-acyloxy-12-hydroxy-5,7,9(11)-pregnatrien-20-one, if the 12-hydroxy instead of the 12-bromo is desired as the starting compound. Other methods for the preparation of the 12-hydroxy compound are described in our copending application Serial No. 228,132, filed May 24, 1951, now abandoned.

In accordance with one of the processes of our invention, adducts of 3β-acyloxy-5,7,9(11)-pregnatrien-12,20-diones are obtained by oxidation with chromic acid of adducts of the corresponding 3β-acyloxy-12-hydroxy-5,7,9(11)-pregnatrien-20-ones. The 12-hydroxy adduct is ordinarily dissolved in acetic acid and an aqueous solution of chromic acid added thereto in a portionwise manner. Decomposition of the excess chromic acid with alcohol, dilution with water, extraction of the mixture with a solvent, e. g., methylene chloride, and removal of the solvent leaves a residue of the crude product, which can be chromatographed and recrystallized to give the pure 12-ketone adduct.

The 3 - acyloxy - 12-keto-5,7,9(11)-pregnatrien-20-one adducts of this invention can also be prepared directly from 3 - acyloxy-12-bromo-5,7,9(11)-pregnatrien-20-one adducts by reaction with silver chromate and chromic acid as disclosed in Example 3 hereinafter. The 12-bromo adduct is dissolved in a suitable solvent, e. g., acetone, and silver chromate is added thereto, followed by an aqueous solution of chromic acid. Upon completion of the reaction, a small quantity of mineral acid, e. g., sulfuric acid, is added and the precipitate filtered from the solution. The filtrate is diluted with water, cooled, and the crystalline 12-keto adduct separated by filtration and purified by chromatography and/or recrystallization, if desired.

*Example 1.—Maleic anhydride adduct of 3 -acetoxy-12-keto-5,7,9(11)-pregnatrien-20-one*

To a solution of 7.7 grams of the maleic anhydride adduct of 3β-acetoxy-12-hydroxy-5,7,9(11)pregnatrien-20-one (melting point, 234–237 degrees centigrade), prepared as described in our application Serial No. 228,132, filed May 24, 1951, now abandoned, in 300 milliliters of acetic acid was added, dropwise and with stirring, a solution of 1.1 grams of chromic acid in 18 milliliters of water. The mixture was allowed to stand at room temperature for 2 hours, excess chromic acid then decomposed by the addition of a small amount of alcohol, and the mixture diluted with 1100 milliliters of water. Extraction with methylene chloride yielded 7.4 grams of crude product on removal of the solvent. The crude product was chromatographed over a column of Superfiltrol-Celite (1:1) and separated into 2 fractions  One fraction, which weighed 1.32 grams, was eluted from the column with ether; the second fraction, which was eluted from the column with methanol, weighed 5.83 grams. The ether-eluted fraction is believed to be a maleic anhydride adduct analogous to the dimethyl maleate adduct described in Example 2 hereinafter and which has a melting point of 218–222 degrees centigrade, and the probable formula disclosed in the said example. Crystallization of the methanol-eluted fraction from an alcohol-acetone mixture yielded 3.15 grams of the maleic anhydride adduct of 3β-acetoxy-12-keto-5,7,9(11)-pregnatrien-20-one, melting point 222–226 degrees centigrade. Several recrystallizations from methanol raised the melting point to 232–235 degrees centigrade.

*Analysis.*—Calculated for $C_{27}H_{30}O_7$: C, 69.51; H, 6.48. Found: C, 69.16; H, 6.75. Ultraviolet peak at 246 millimicrons; extinction coefficient of 9900.

*Example 2.—Dimethyl maleate adduct of 3β-acetoxy-12-keto-5,7,9(11)-pregnatrien-20-one*

In a manner similar to that disclosed in Example 1 hereinbefore, the dimethyl maleate adduct of 3β-acetoxy-12-hydroxy - 5,7,9(11) - pregnatrien-20-one (melting point, 205–214 degrees centigrade), prepared as described in our copending application Serial No. 228,132, filed May 24, 1951, was converted to the dimethyl maleate adduct of 3β-acetoxy-12-keto-5,7,9(11)-pregnatrien-20-one, melting point 213–215 degrees centigrade; $[\alpha]_D^{26}$ of +180.2 degrees (chloroform).

*Analysis.*—Calculated for $C_{29}H_{36}O_8$: C, 67.95; H, 7.08. Found: C, 67.99; H, 7.05. Ultraviolet peak at 248 millimicrons; extinction coefficient of 12400. The crude product was purified by chromatography over an alumina column, using a 1:1 mixture of benzene and ether as the eluent.

A second fraction was eluted from the column with ether, and was recrystallized and found to melt at 218–222 degrees centigrade. Its empirical formula was $C_{29}H_{38}O_9$, containing one atom of oxygen and two atoms of hydrogen more than that eluted with the benzene-ether mixture.

*Analysis.*—Calculated for $C_{29}H_{38}O_9$: C, 65.64; H, 7.22.

Found: C, 65.64; H, 7.16. The compound eluted with ether has the probable structural formula:

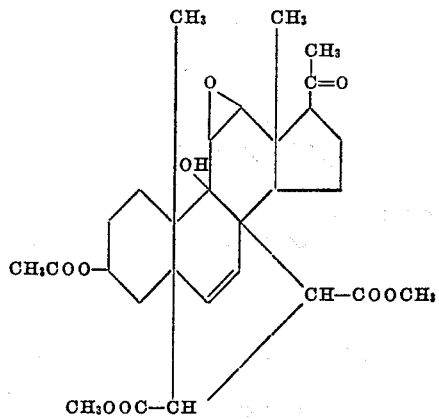

which formula was supported by infrared studies.

*Example 3.—Maleic anhydride adduct of 3β-acetoxy-5,7,9(11)-pregnatrien-12,20-dione*

One gram of the maleic anhydride adduct of 3β-acetoxy-12-bromo-5,7,9(11)-pregnatrien-20-one (prepared as described in our copending application Serial No. 184,702, now U. S. Patent 2,623,043, issued December 23, 1952) was dissolved in 30 milliliters of acetone by warming on the steam bath. The solution was cooled to room temperature and 0.46 gram of silver chromate, followed by 0.35 gram of chromic acid dissolved in 6 milliliters of water, was added thereto. The mixture was stirred for 2 hours, 1 milliliter of 5-normal sulfuric acid added, the mixture stirred for an additional 30 minutes and then filtered. To the filtrate was added 100 milliliters of water. Upon cooling, 0.753 gram of crystalline material, melting at 228–231 degrees centigrade, was obtained. Purification of this material by chromatography over Superfiltrol-Celite gave the pure maleic anhydride adduct of 3β-acetoxy-5,7,9(11)-pregnatrien-12,20-dione.

*Example 4.—Dimethyl maleate adduct of 3β-acetoxy-5,7,9(11)-pregnatrien-12,20-dione*

Similarly, by the method of the preceding example, the dimethyl maleate adduct of 3β-acetoxy-12-bromo-5,7,9(11)-pregnatrien-20-one (prepared as described in our copending application Serial No. 184,702, now U. S. Patent 2,623,043, issued December 23, 1952) was converted to the dimethyl maleate adduct of 3β-acetoxy-5,7,9-(11)-pregnatrien-12,20-dione.

The maleic acid and maleic anhydride adducts of 3-acyloxy-5,7,9(11)-pregnatrien-12,20-diones of this invention are convertible to trienes, namely, 3-acyloxy-5,7,9-(11)-pregnatrien-12,20-diones, having double bonds at the 5(6), 7(8), and 9(11) positions, and the formula:

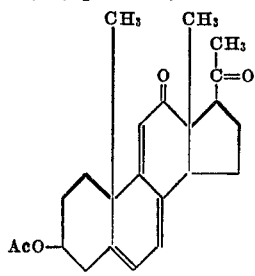

wherein Ac has the significance hereinbefore specified. The removal of the maleic acid or maleic anhydride radical is effected by a pyrolysis reaction which is more fully described and claimed in our copending application Serial No. 228,134, filed May 24, 1951, now Patent No. 2,655,-516, and consists essentially in heating the maleic acid or maleic anhydride adduct of the 3-acyloxy-5,7,9(11)-pregnatrien-12,20-dione in the presence of an organic amine at a temperature of approximately 100 to approximately 225 degrees centigrade, with or without the presence of an organic solvent, and thereafter isolating the product triene. It is not necessary to isolate the adducts from a reaction mixture in order to effect the removal of the adduct radical in accordance with such pyrolysis processes, since the entire reaction mixture or crude product may be treated. The desired triene can be obtained in a high degree of purity and in excellent yields.

Amines which can be used in this pyrolysis process include: secondary aliphatic amines such as dimethylamine, diethylamine, dipropylamine, dibutylamine, diamylamine, dioctylamine; tertiary aliphatic amines such as trimethylamine, triamylamine, methyldioctylamine, methyldiethylamine; secondary and tertiary cycloaliphatic amines such as N-methylcyclohexylamine, N,N-dimethylcyclohexylamine, N,N - diethylcyclohexylamine; secondary and tertiary heterocyclic amines such as pyrrolidine, N - methylmorpholine, N - ethylpyrrolidine, morpholine, piperidine, N-methylpiperidine, 2-methylpiperidine, 1,2-dimethylpiperidine, 1,2,4-trimethylpiperidine, 2,4,6 - trimethylpiperidine, 1-ethyl-2,4,6-trimethylpiperidine; aromatic heterocyclic amines such as pyridine, picoline, lutidine, colidine, quinoline, quinaldine, lepidine, 3-methylquinoline; secondary and tertiary carbocyclic aromatic amines such as N-methylaniline, N-ethylaniline, N-butylaniline, N-benzylaniline, N,N-dimethylaniline, N,N-diethylaniline, N,N-dibutylaniline, N,N-dibenzylaniline, N-methyltoluidine, N,N-diethyltoluidine, N-ethylxylidine, N,N-dimethylxylidine; substituted aliphatic amines such as diethylaminoethanol, dibutylaminoethanol, N-pyrrolidylethanol, N-piperidylethanol; substituted aromatic amines such as ortho-methoxy-N,N-dimethylaniline, para-ethoxy-N,N-diethylaniline, para-chloro-N,N-dimethylaniline, para-bromo-N,N-diethylaniline, para-fluoro-N,N-dibutylaniline, N,N-dimethylmesidine (N,N-dimethyl-2,4,6-trimethylaniline); secondary and tertiary aralkyl amines such as methylbenzylamine, dimethylbenzylamine, propylbenzylamine, diisopropylphenethylamine, diethylphenylisopropylamine; and primary amines such as butylamine, hexylamine, octylamine, cyclohexylamine, aniline, toluidine, xylidine, and the like.

The process comprises heating the selected 3-acyloxy-12,20-dione maleic acid or maleic anhydride adduct to a temperature between approximately 100 and approximately 225 degrees centigrade, preferably between 175 and 200 degrees centigrade, in the presence of an organic amine, removing excess amine, and recovering the product triene. The time required for the reaction is usually from approximately 1 to approximately 8 hours, depending upon such factors as the particular steroid adduct being treated, the amine employed, and the temperature of reaction. Ordinarily, a reaction period of approximately 4 hours is entirely satisfactory, although, at lower temperatures, a more extended period may be employed to advantage. The employment of pressure may in some cases be advantageous, although it is in most cases preferred to conduct the pyrolysis reaction at atmospheric pressure. After completion of the reaction, the pure triene product can be recovered in conventional manner, such as by evaporation of solvent in vacuo, redissolving the residue in an organic solvent, e. g., methanol, diluting with water, extracting with ether, washing the solution until neutral, drying, evaporating to dryness, chromatographing over an alumina column, and recrystallizing from an organic solvent, if desired.

Although the foregoing specification is directed particularly to the maleic anhydride and dimethyl maleate adducts of 3β-acetoxy-5,7,9(11)-pregnatrien-12,20-diones, and methods for their preparation from both 12-hydroxy and 12-bromo derivatives, it is to be understood that this is merely by way of illustration and that modifications and alterations may be made therein in conventional manner and in accordance with the principles herein set forth, and that the invention is to be limited solely by the scope of the appended claims.

We claim:

1. An adduct of 3β-acyloxy-5,7,9(11)-pregnatrien-12,-20-having the formula:

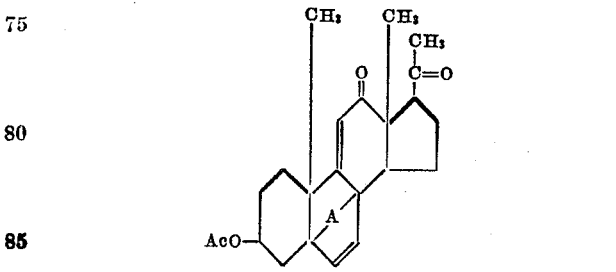

in which Ac is an acyl radical of a hydrocarbon aliphatic carboxylic acid containing from 1 to 8 carbon atoms, inclusive, and A is the adduct radical of an α,β-unsaturated carbonyl compound of the group consisting of maleic acid, maleic anhydride, and di-lower-alkyl maleates whose alkyl radicals contain from 1 to 8 carbon atoms, inclusive.

2. A maleic anhydride adduct of a 3β-acyloxy-5,7,9-(11)-pregnatrien-12,20-dione, wherein the acyloxy group is of the formula AcO, Ac being the acyl radical of a hydrocarbon aliphatic carboxylic acid containing up to eight carbon atoms, inclusive.

3. A di-lower-alkyl maleate adduct of a 3β-acyloxy-5,7,9(11)-pregnatrien-12,20-dione, wherein the acyloxy group is of the formula AcO, Ac being the acyl radical of a hydrocarbon aliphatic carboxylic acid containing up to eight carbon atoms, inclusive, 4. The maleic anhydride adduct of 3β-acetoxy-5,7,9-(11)-pregnatrien-12,20-dione.

5. The dimethyl maleate adduct of 3β-acetoxy-5,7,9-(11)-pregnatrien-12,20-dione.

6. A dimethyl maleate adduct having the empirical formula $C_{29}H_{38}O_9$ and a melting point of approximately 218–222 degrees centigrade and the structural formula:

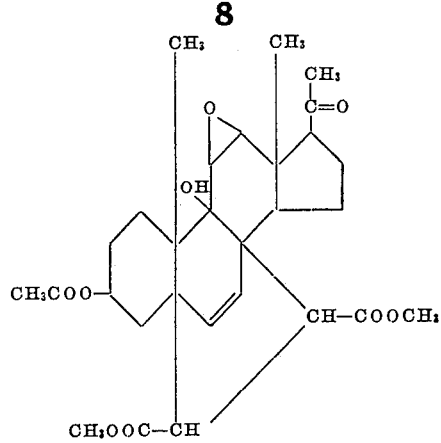

No references cited.